(12) United States Patent
DiBiase et al.

(10) Patent No.: US 7,337,698 B2
(45) Date of Patent: Mar. 4, 2008

(54) ADJUSTABLE PIPE SHAVING DEVICE

(75) Inventors: Nino DiBiase, Ontario (CA); Michael Salluce, Ontario (CA)

(73) Assignee: S & D Machine and Tool, Ontario (CA)

( * ) Notice: Subject to any disclaimer, the term of this patent is extended or adjusted under 35 U.S.C. 154(b) by 139 days.

(21) Appl. No.: 11/112,897

(22) Filed: Apr. 22, 2005

(65) Prior Publication Data

US 2006/0236547 A1    Oct. 26, 2006

(51) Int. Cl.
    B23B 3/00    (2006.01)
(52) U.S. Cl. ................... 82/70.2; 82/113; 82/162
(58) Field of Classification Search ............... 82/70.2, 82/113, 127, 162, 164, 903
    See application file for complete search history.

(56) References Cited

U.S. PATENT DOCUMENTS

| | | |
|---|---|---|
| 2,607,376 A | 8/1952 | Montgomery |
| 3,171,309 A | 3/1965 | Cloutier |
| 3,595,107 A | 7/1971 | Dackow |
| 3,636,803 A | 1/1972 | Miller |
| 3,661,472 A | 5/1972 | Beauloye |
| 3,817,649 A | 6/1974 | Medney |
| 4,114,485 A | 9/1978 | Coblitz et al. |
| 4,586,408 A | 5/1986 | Goldner |
| 4,663,794 A | 5/1987 | Evans |
| 4,665,782 A | 5/1987 | Vander Pol |
| 4,691,600 A | 9/1987 | Carlson et al. |
| 4,744,123 A | 5/1988 | Le Tustu et al. |
| 4,825,543 A | 5/1989 | Thalmann et al. |
| 4,958,542 A | 9/1990 | Skerrett |
| 5,020,401 A | 6/1991 | Jiles |
| 5,092,205 A | 3/1992 | Gwyn |
| 5,351,587 A | 10/1994 | Griffen |
| 5,549,024 A | 8/1996 | Ricci |
| 5,600,862 A | 2/1997 | Bleske et al. |
| 5,732,728 A * | 3/1998 | Maichel ................... 137/15.14 |
| 5,775,188 A * | 7/1998 | Strait ........................ 82/1.11 |
| 5,894,772 A | 4/1999 | Nodar |
| 5,934,688 A * | 8/1999 | VanderPol et al. ............ 279/58 |
| 5,941,145 A * | 8/1999 | Marshall et al. ............... 82/113 |
| 6,434,776 B1 | 8/2002 | Pfeiffer et al. |
| 6,505,533 B2 * | 1/2003 | Kroisandt ...................... 82/53 |
| 6,698,321 B2 | 3/2004 | Oswald |
| 7,003,998 B1 * | 2/2006 | Smith ........................... 72/86 |
| 7,047,850 B2 * | 5/2006 | Merle ........................ 82/70.2 |

\* cited by examiner

*Primary Examiner*—Willmon Fridie, Jr.
(74) *Attorney, Agent, or Firm*—Tarolli, Sundheim, Covell & Tummino LLP

(57) ABSTRACT

A pipe shaving device for removing a uniform layer of material from the outer circumference of a pipe is provided. The device comprises a first frame member providing at least two support surfaces for the pipe, a second frame member slidable with respect to the first frame member so as to allow the device to engage and support a pipe, and a cutting platform mounted on the second frame member, the cutting platform providing a cutting blade for removing a uniform thickness of material from the outer diameter of the pipe when the pipe and the device are rotated relative to one another.

6 Claims, 9 Drawing Sheets

ADJUSTABLE PIPE SHAVING DEVICE

FIELD OF THE INVENTION

The present invention relates to an adjustable pipe-shaving device for removing a uniform layer of material from the outer circumference of a pipe, in particular a plastic pipe.

BACKGROUND OF THE INVENTION

Plastic pipes made of polyvinyl chloride, polyethylene, or other suitable plastic materials are routinely used for the transport of natural gas. As can be appreciated, these pipes are arranged and interconnected as required to establish the required distribution network. Before these pipes can be welded or bonded, it is necessary that the oxide layer formed on the outermost surface of the pipe be removed. This oxide layer results from exposure of the pipe to ultraviolet light and can adversely affect the bonding process. To remove this oxide layer, a number of devices have been developed.

U.S. Pat. No. 4,114,485 to Coblitz et al discloses to an articulating device that both cuts and bevels selective lengths of pipe. The device is designed to accommodate a variety of pipe diameters by having a selectably positionable roller slide. Although adjustable, the device is not suited to continual fixed-thickness material removal from the outer circumference of an end region, or central region of a pipe. Instead, the device operates much like a conventional pipe cutter, wherein the cutting element is gradually moved radially inwards to engage the workpiece. As such, the device is not self-feeding (i.e. the pipe cannot move longitudinally), but rather requires continual alignment of the workpiece with the cutter.

U.S. Pat. No. 4,663,794 to Evans discloses a plastic pipe scraper for scraping the outside circumference of a plastic pipe. The device comprises a frame member adapted to fit over the plastic pipe, and a scraper blade pivotally attached to one end of the frame member. The scraper blade is urged to engage the plastic pipe by way of an adjustable spring means. While this device appears to be capable of scraping both end and central regions of pipe, the device is not universal (i.e. designed to fit a broad range of pipes). In engaging a pipe to be scraped, the scraper blade forms part of the engagement means. Moreover, aside from the adjustable spring means designed to urge the blade into contact with the pipe, there is no real means to firmly tighten the device on a pipe.

U.S. Pat. No. 4,825,543 to Thalmann et al discloses a cutting tool device comprising a pair of articulated arcuate strap members adapted to be clamped about a cylindrical pipe for cutting about the circumference of either an end portion, or central portion of pipe. This device lacks the ability to adjust to a wide variety of standard size pipes used in the industry. Attachment of the device to a pipe relies on a bell crank-connection to impart sufficient clamping pressure through the strap members. There is no facility to further tighten and/or adjust the clamping force of the device.

U.S. Pat. No. 6,698,321 to Oswald discloses a pipe shaver device suited for removing a uniform layer of material from the outer diameter of a pipe. The device is designed for one size of pipe (i.e. it is not adjustable to suit a variety of standard size pipes). The device also incorporates a shoulder stop that prevents passage of the pipe through the device unless a set thickness of material has been removed by the cutting blade, thus interfering with use in central regions of pipe. This device also requires that the user apply manual force in the longitudinal direction to feed the pipe through the device as there is no self-feeding or "walking" function.

From the above discussion, one can appreciate there is clearly a need for an improved pipe shaving device that is suited for use on both end regions and central portions of pipe and which is adjustable to accommodate a variety of pipe diameters.

It is therefore an object of the present invention to obviate or mitigate at least one of the above described disadvantages.

SUMMARY OF THE INVENTION

According to one aspect of the present invention there is provided a device for removing a uniform layer of material from the outer circumference of a pipe. The device comprises a first frame member providing at least two support surfaces for the pipe. A second frame member slidable on at least one slider is mounted on the first frame member so as to allow the second frame member to linearly displace relative to the first frame member from a first open position to a second engaged position. The second frame member provides at least one additional support surface adapted to cooperate with the at least two support surfaces of the first frame member, so as to allow the device to engage and support a pipe. A cutting platform is mounted on the second frame member. The cutting platform provides a cutting blade for removing a uniform thickness of material from the outer diameter of the pipe when the pipe and the device are rotated relative to one another.

According to another aspect of the present invention, there is provided a device for removing a uniform layer of material from the outer circumference of a pipe. The device comprises a first frame member providing at least two support surfaces for the pipe. A second frame member is slidable relative to the first frame member so as to allow the device to engage and support a pipe. A cutting platform is mounted on the second frame member. The cutting platform is positioned to impart a feeding effect so as to direct a pipe through the device when the pipe and the device are rotated relative to one another. The cutting platform has a cutting blade for removing a uniform thickness of material from the outer diameter of the pipe.

According to a further aspect of the present invention, also provided is an actuator for moving the second frame member relative to said the frame member.

DESCRIPTION OF THE PREFERRED EMBODIMENTS

Figure 1:
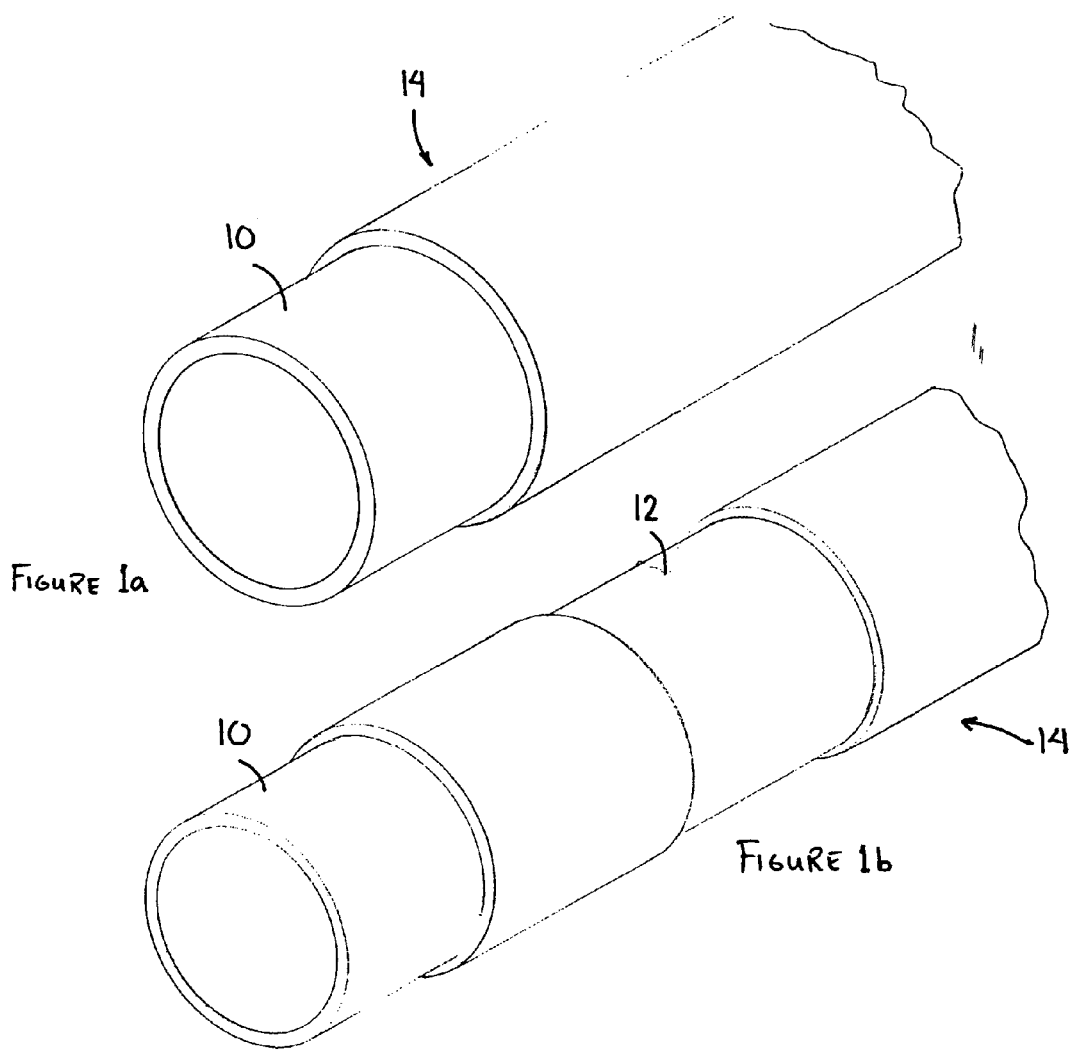
FIGS. 1a and 1b are a perspective views of pipes processed with the pipe shaving device of the present invention.

The pipe shaving device is used to remove a uniform layer of material from the outer circumference of a plastic pipe, as represented in FIGS. 1a and 1b. As shown, the device is able to remove this material from end regions 10, as well as central portions 12 of a pipe 14. Removal of this material, or more specifically of the oxide layer on the outer circumference of the pipe is necessary in certain circumstances as it interferes with proper welding or bonding during pipeline installation and/or repair. The pipe shaving device is also adjustable to accommodate a variety of pipe diameters. For example, in a preferred embodiment, the device is dimensioned for use with pipes ranging from 1 inch to 3 inch (outside diameter—O.D.). It can be appreciated, however, that the device could be appropriately scaled to accommodate smaller pipes (i.e. ½ inch to 1 inch—O.D.) or larger pipes (i.e. 4 inch to 6 inch—O.D.), as required. The pipe shaving device is also configured to provide a feeding effect when the pipe and device are rotated relative to one another. With respect to the material being removed, the thickness of the shaving is generally in the range of 6 to 12 thousands of an inch, but thinner or thicker shavings remain within the ability of the pipe shaver device.

Figure 2:
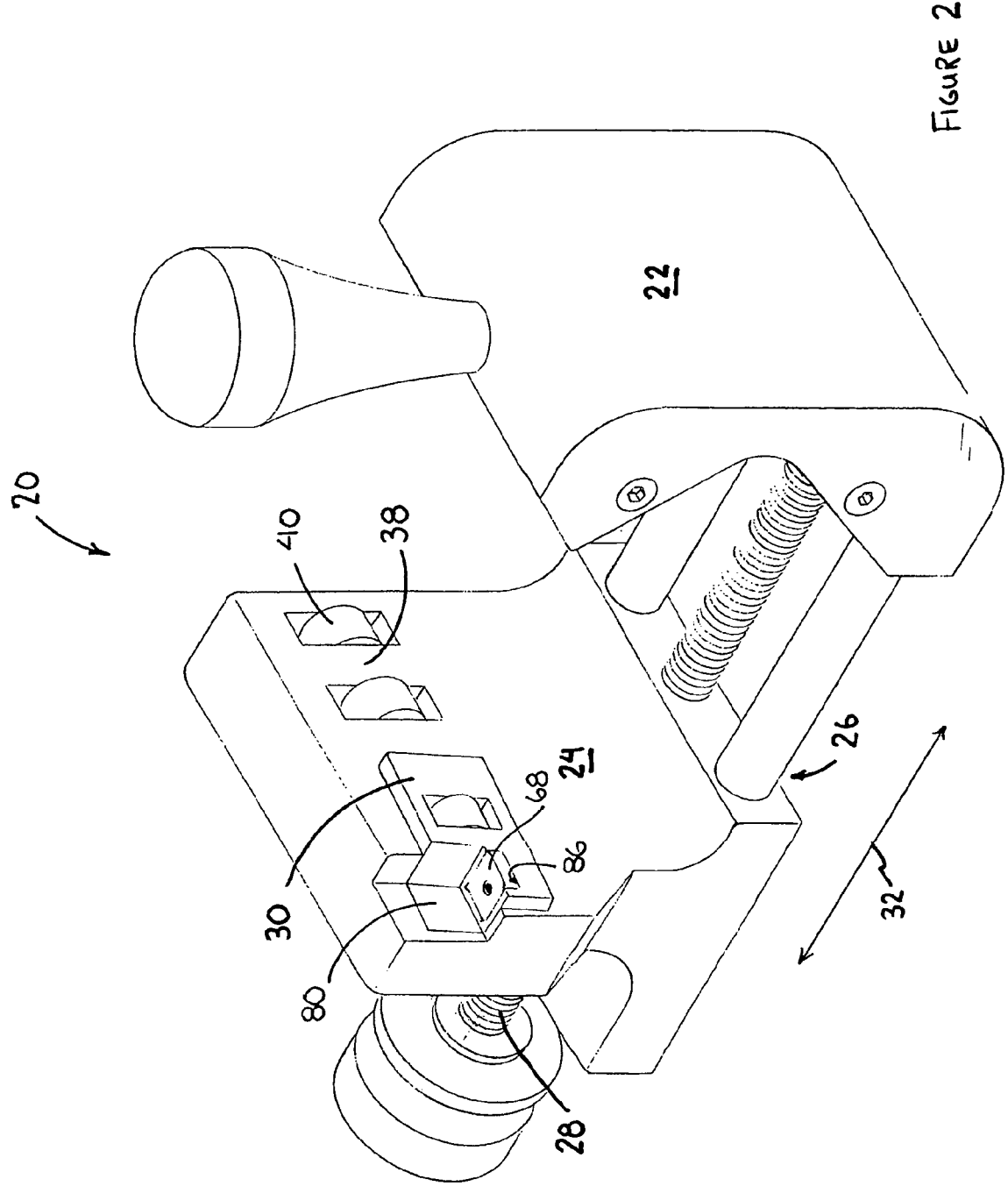
FIG. 2 is a perspective view of the pipe shaving device in an open position, ready to receive a pipe.

Turning now to FIG. 2, generally identified as reference numeral 20 is the pipe shaving device. FIG. 2 shows the device 20 as generally comprising a first frame member 22, a second frame member 24, a slide mechanism 26, a threaded actuator 28 and a cutting platform 30. The second frame member 24 is movable, or more specifically can be linearly displaced relative to the first frame member 22, as represented by arrow 32. The movement of the second frame member 24 is guided by the slide mechanism 26; this movement or adjustability allows the device 20 to accommodate a variety of pipe diameters as will be discussed in greater detail below.

Figure 3:
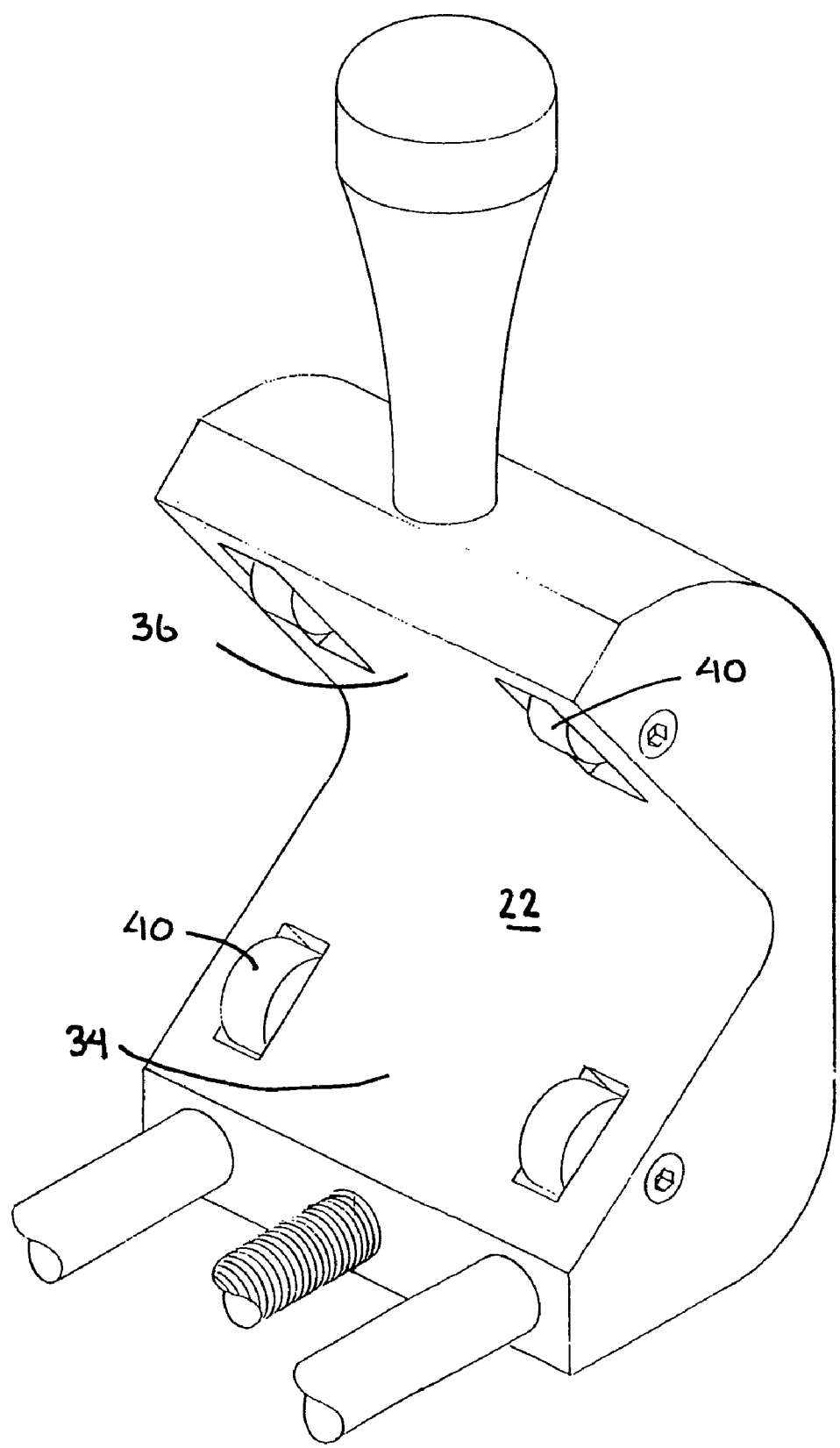
FIG. 3 is perspective view of the first frame member of the pipe shaving device.

As more clearly shown in FIG. 3, the first frame member 22 comprises two support surfaces 34, 36 that cooperate with a support surface 38 on the second frame member 24 (see FIG. 2) to engage a pipe during use. To facilitate rotation of the pipe, these support surfaces 34, 36, 38 may be configured with suitable low-friction contact means. In the embodiment shown, the low-friction contact means comprises a plurality of spaced-apart roller bearings 40. It can be appreciated, however, that other suitable low-friction means or materials could be incorporated into the design. For example, one skilled in the art may choose to implement a section of UHMW (Ultra High Molecular Weight) low-friction polymer in the region of the support surfaces 34, 36, 38 to reduce friction at the contact points.

As indicated above, the second frame member 24 is movable relative to the first frame member 22, so as to allow the device 20 to accommodate a variety of pipe diameters. This movement is linear, as represented by arrow 32 in the embodiment shown in FIG. 4. This linear displacement ensures alignment of the support surfaces 34, 36, 38, or in particular of the roller bearings 40 provided on these surfaces (note that roller guide 40 for support surface 38 is not shown in FIG. 4). This generally triangular support configuration ensures that the device is correctly mounted and aligned with respect to the longitudinal axis of the pipe, thus ensuring that the material being removed is uniform in thickness about the entire circumference of the pipe.

Figure 4:
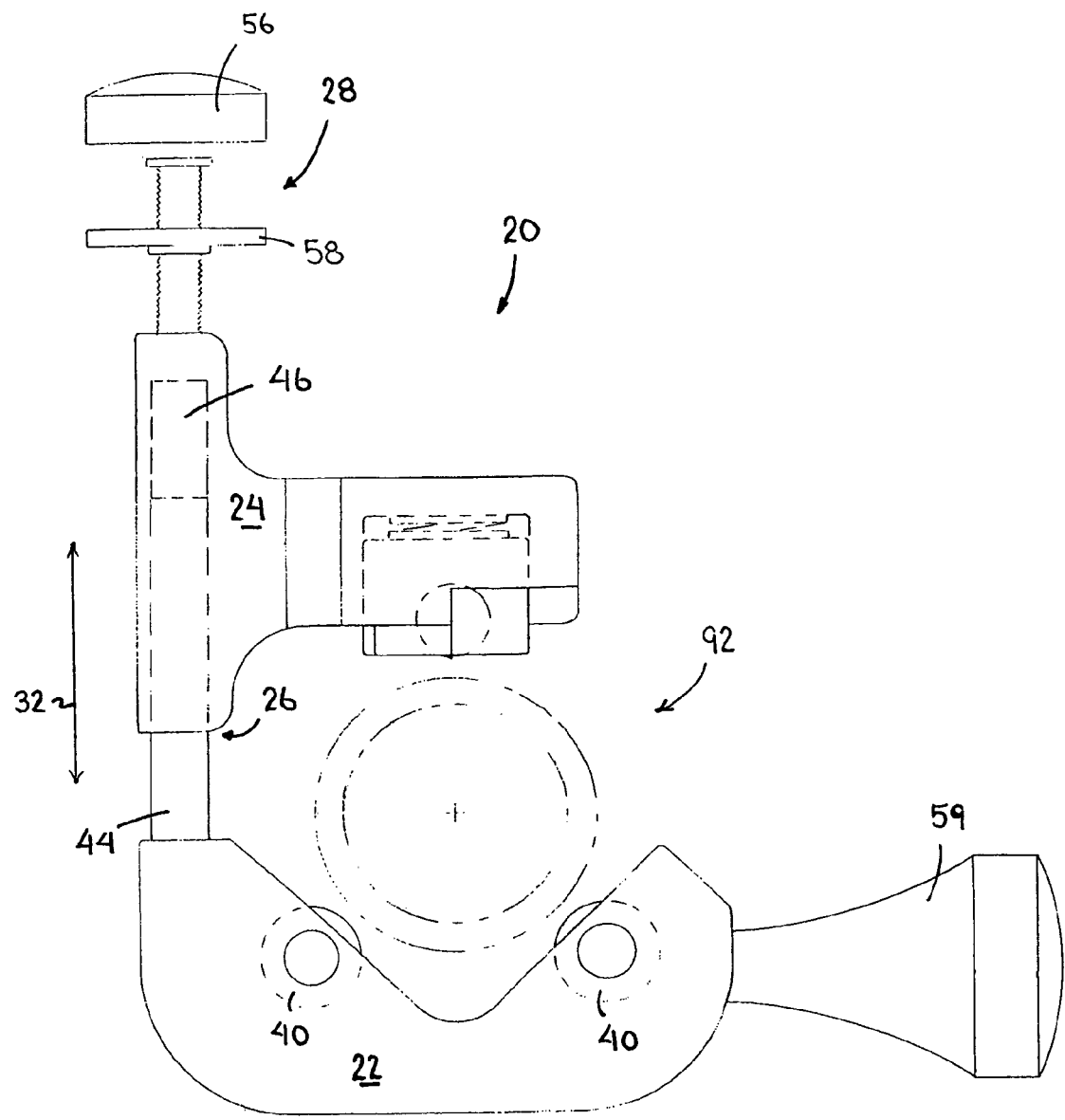
FIG. 4 is a partial side-sectional view of the pipe shaving device shown with a pipe in position.

Continuing with FIG. 4, the slide mechanism 26 generally comprises a pair of slide bars 44 (only one visible in FIG. 4—see FIG. 4a) fixedly mounted in the first frame member 22. These slide bars 44 are slidably received by corresponding boreholes 46 in the second frame member 24. In this configuration, the second frame member 24 is able to slide in the direction of arrow 32 relative to the first frame member 22. In the embodiment shown in the Figures, slide bars comprised of rods of circular cross-section are shown, but it can be appreciated that bars of square or other suitable cross-section could also be used. It should also be recognized that the device can be provided with a single slide bar, or multiple slide bars, so long as the arrangement retains the above noted alignment.

Figure 4A:
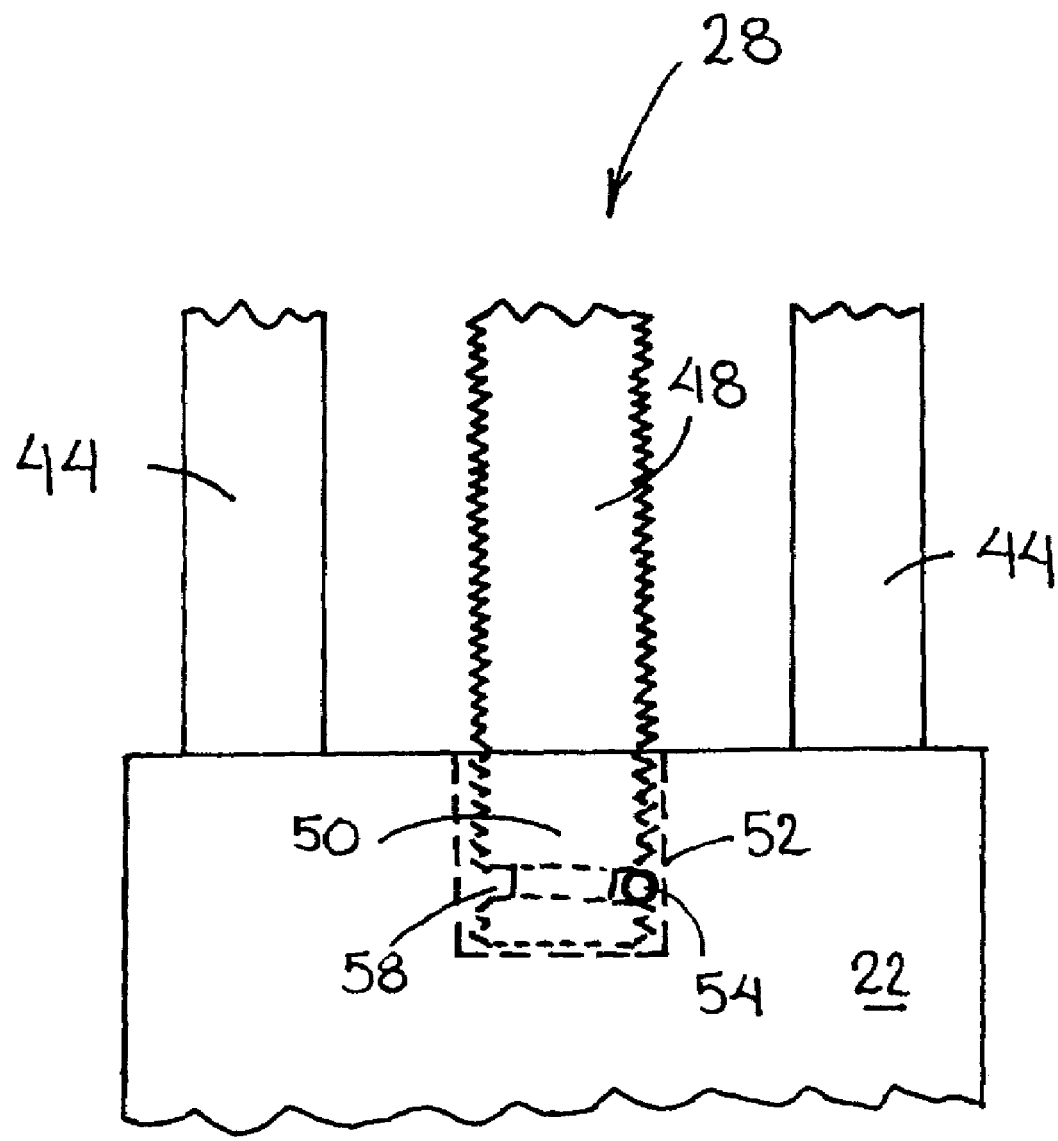
FIG. 4a is a partial rear-sectional view of the pipe shaving device detailing features of the actuator mechanism.

To move the second frame member 24 along the slide mechanism 26, the threaded actuator 28 is rotated. As shown in FIG. 4a, the threaded actuator 28 generally comprises a threaded rod 48 that has a first end 50 rotatably mounted in a borehole 52 of the first frame member 22. In the embodiment shown, this first end 50 of the threaded rod 48 is maintained in the borehole 52 by way of a pin 54 that resides in a circumferential groove 56 in the vicinity of the first end 50, thus allowing rotation of the threaded rod 48, but preventing removal. The threaded rod 48 then passes through and threadably engages the second frame member 24 (as shown in FIG. 2), thereby driving the second frame member 24 to move relative to the first frame member 22 upon rotation of the threaded actuator 28. As indicated above, the movement of the second frame member 24 is guided by the slide mechanism 26, so as to ensure alignment of the support surfaces 34, 36, 38. To facilitate manual rotation of the threaded actuator, a suitable handle or knob 56 may be provided. Also note the provision of a movable threaded lock 58 on threaded rod 48, enabling the user to lock the second frame member 24 in position about a pipe being scraped. In addition to the handle provided on the threaded actuator 28, the first frame member 22 is also preferably provided with a handle 59.

While the embodiment discussed above makes reference to the use of a threaded actuator 28 to move the second frame member 24 relative to the first frame member 22, it can be appreciated that one skilled in the art may choose to implement an alternate suitable means to achieve this effect.

Figure 5:
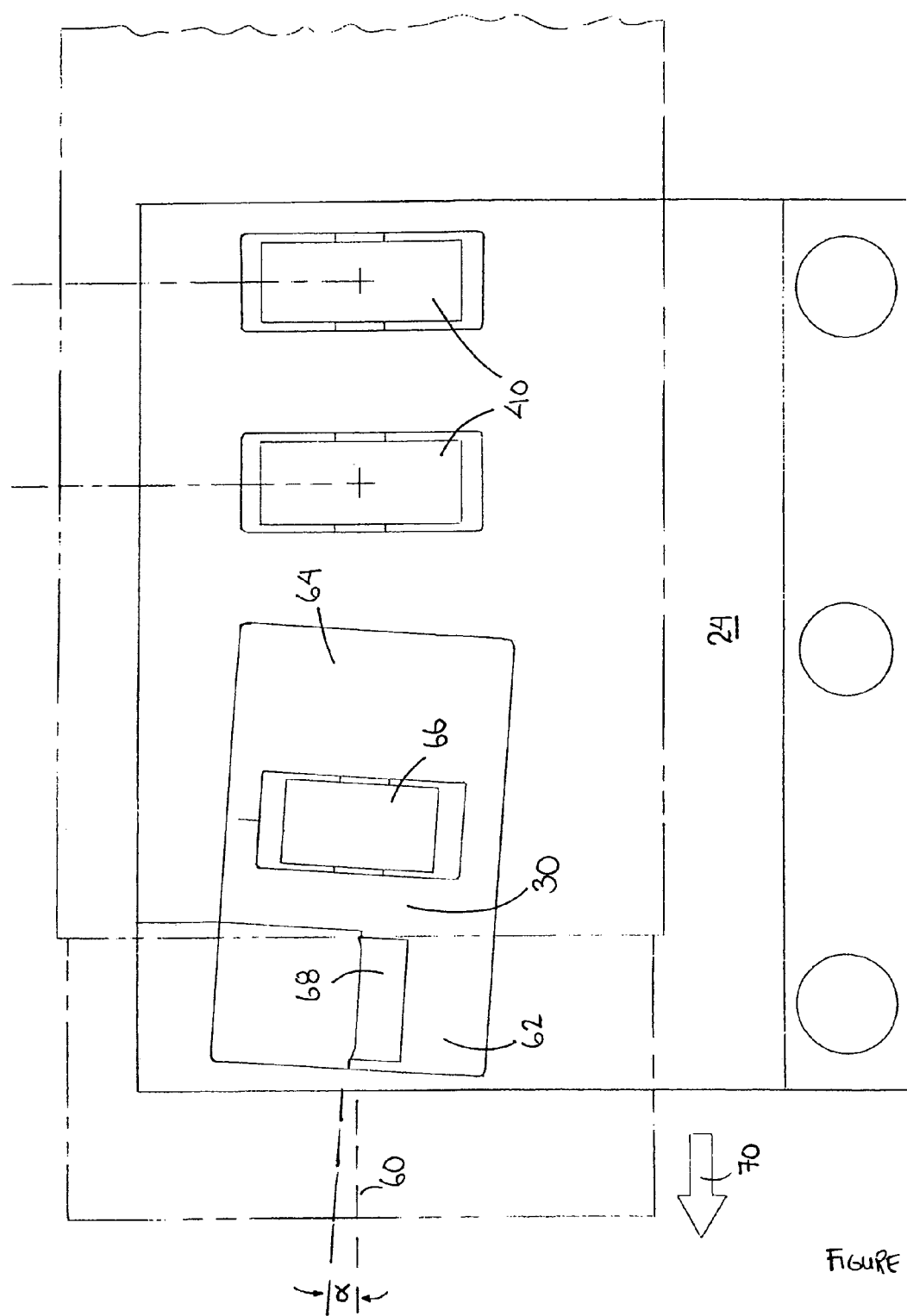
FIG. 5 is a view of the operating face of the second frame member of the pipe shaving device, detailing the arrangement of the cutting platform.

As shown in FIG. 5, the cutting platform 30 is mounted in the second frame member 24, and is angularly offset relative to the longitudinal axis 60 of a pipe contained therein. Preferably, this angle α ranges from about 2° to about 10°, with the discharge end 62 being outwardly displaced relative to the input end 64. A particularly preferred embodiment, the angle α is 3°. By way of this configuration, the rotational axis of roller bearing 66 provided on the cutting platform 30 is also correspondingly angled, thereby imparting a forward motion or feeding effect, as indicated by arrow 70, upon a pipe being rotated therein. In the embodiment shown, the pipe is rotated clockwise to feed towards the discharge end. With this feeding effect, the pipe advances through the device, engaging blade 68, removing in spiral fashion a uniform thickness of material from the outer circumference of the pipe.

Figure 6:
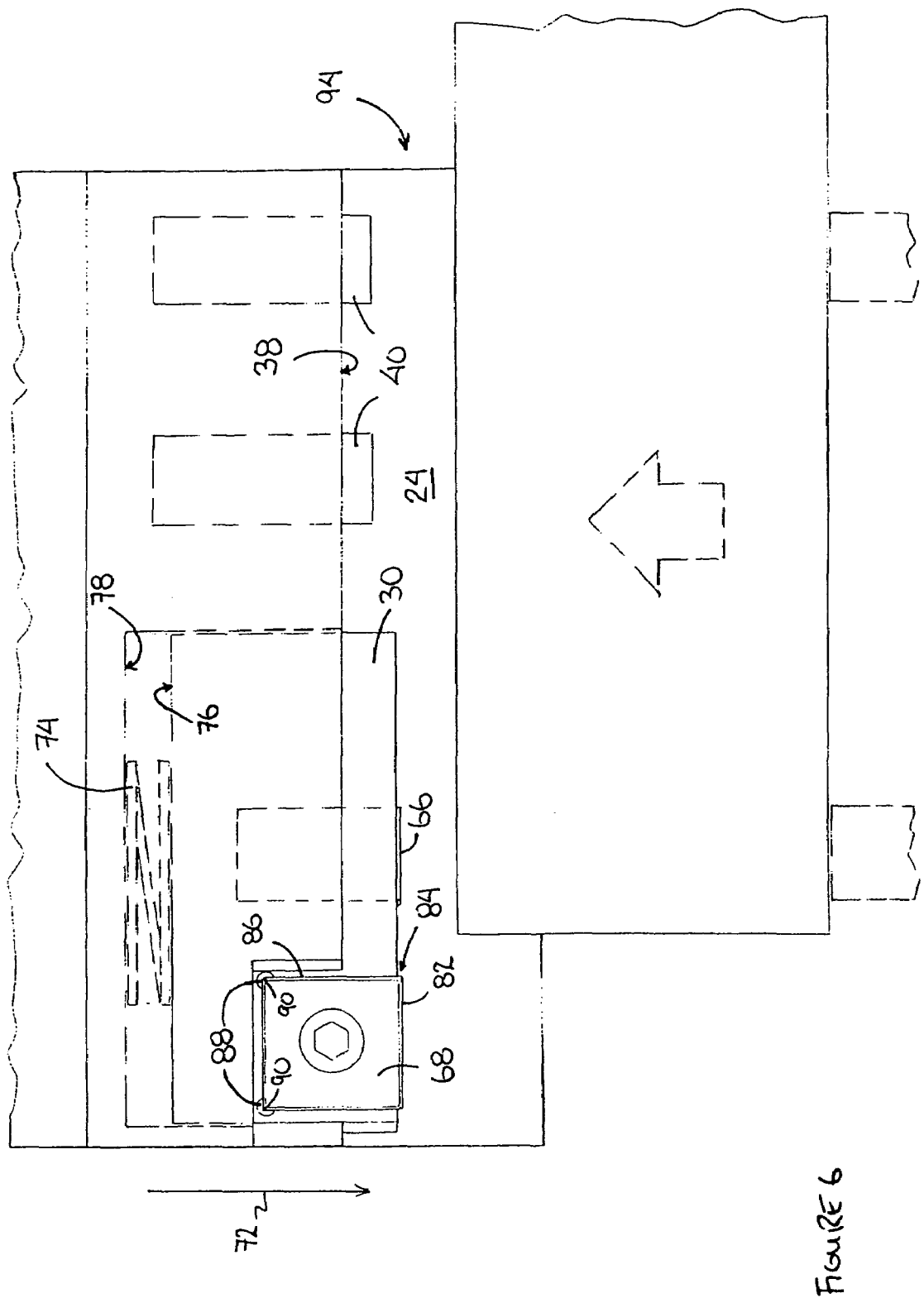
FIG. 6 is a partial sectional view of the pipe shaving device showing initial placement of a pipe in the device.

As better represented in FIG. 6, the cutting platform 30 is biased radially inwards towards the pipe being processed, in the direction of arrow 72. This action is provided by way of a spring 74 or other suitable biasing device mounted between the base 76 of the cutting platform 30 and the platform footing 78 provided by the second frame member 24. As such, the cutting platform 30, and thus the blade 68 is urged into contact with the pipe being processed, regardless of any ovality or eccentricity that may be present in the pipe. In the embodiment shown, as the device is tightened about a pipe to be processed, the cutting platform 30 is urged inwards towards the platform footing 78 until roller bearing 66 is aligned with roller bearings 40 on support surface 38. With this arrangement, it can be appreciated that the diameter of the roller bearing 66 used on cutting platform 30 provides a degree of adjustability with respect to depth of cut, in that a roller bearing of increased diameter provides for a shallower cut, and visa versa. Also note that the cutting platform 30 is configured with a recessed area 80, best seen in FIG. 2, that serves to provide access to the blade for changing/repositioning, as well as to create an unobstructed discharge area for the shaved material.

Continuing with FIG. 6, the blade 68 mounted on cutting platform 30 is provided with at least one sharp edge 82 that is aligned to sit slightly exposed or extended 84 from the cutting platform 30. The blade 68 is configured to be replaceable and is preferably configured with multiple sharp edges enabling the operator to quickly rotate the blade to a new edge when required. To ensure that the sharp edges of the blade remain undamaged, the blade 68 is preferably seated in a recess 86 that further comprises corner cutouts 88 so as to prevent contact of the blade corners 90 with the cutting platform 30.

Figure 7:
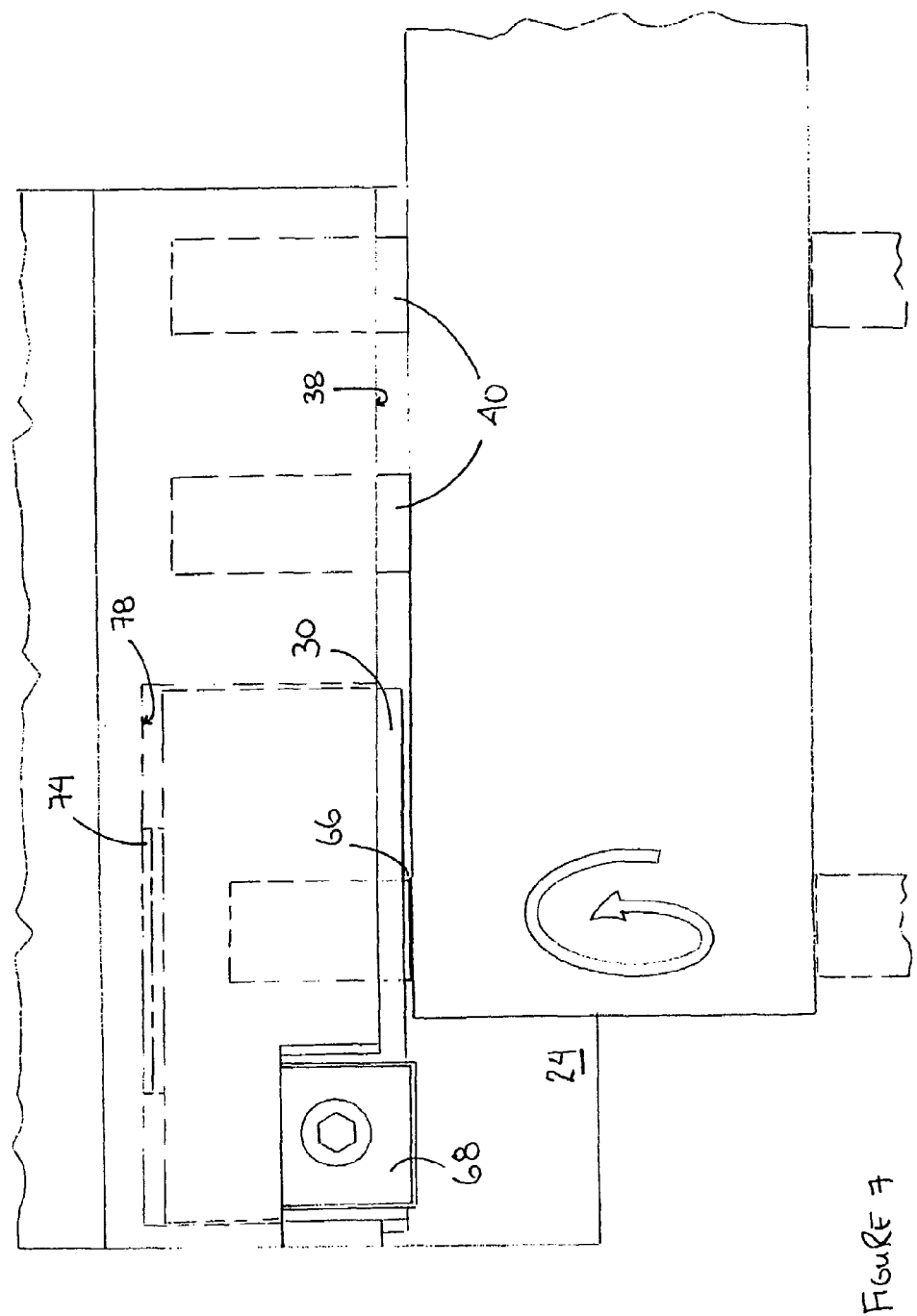
FIG. 7 is a partial sectional view of the pipe shaving device showing engagement and rotation of the pipe relative to the device.
Figure 8:
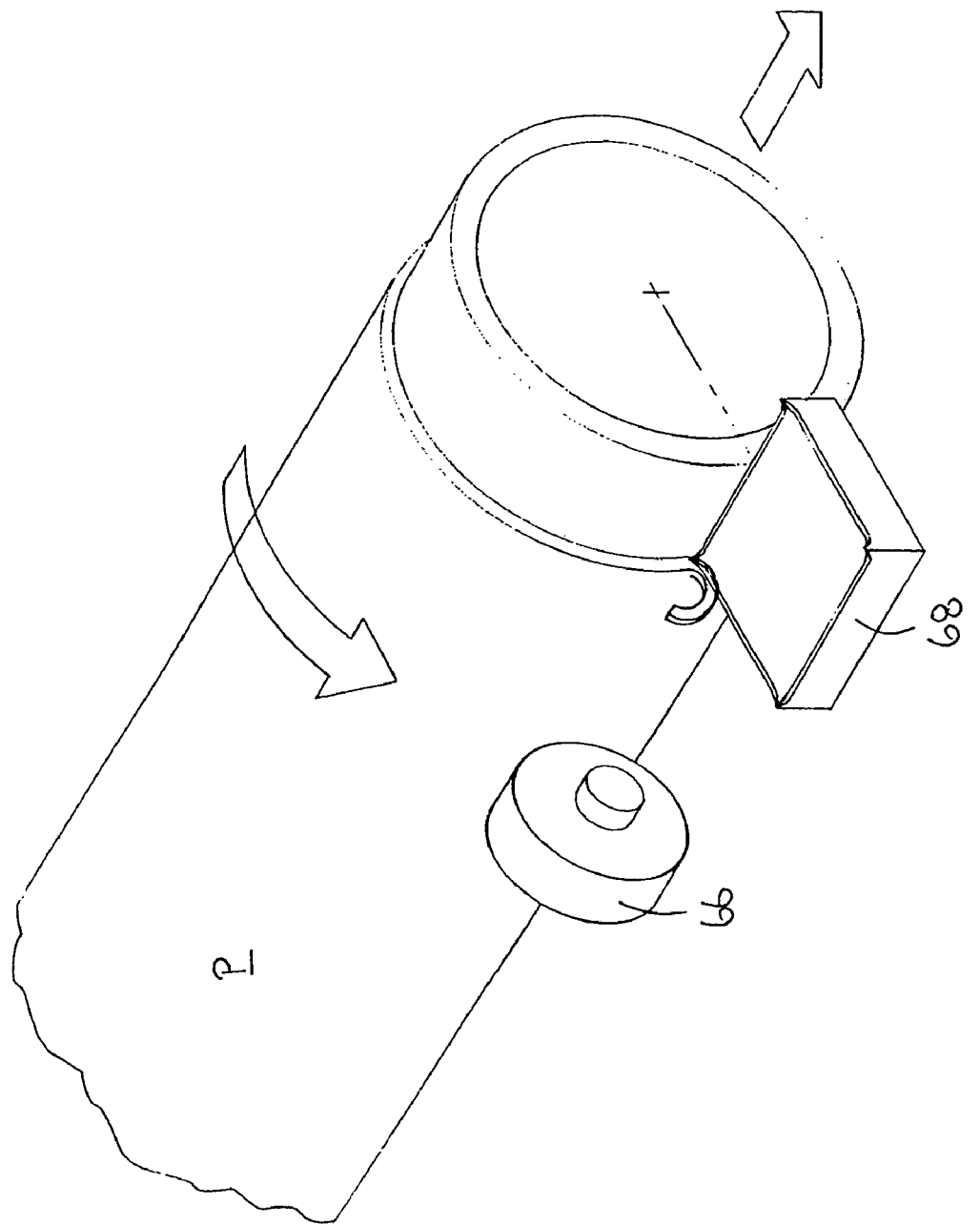
FIG. 8 is a simplified perspective detailing removal of a uniform thickness shaving from the outer circumference of a pipe.

The operation of the pipe shaving device will first be described relative to use on an end section of pipe. With end sections of pipe, one can readily appreciate that the pipe can either be dropped into the device through opening 92 (see FIG. 4), or inserted through input end 94 (see FIG. 6). Regardless of how the pipe is loaded into the device, the pipe is then aligned relative to the support surfaces 34, 36, 38 as shown in FIG. 6. The operator subsequently tightens the device using the threaded actuator 26, urging cutting platform 30 inwards towards the platform footing 78, until roller bearing 66 is ultimately aligned with roller bearings 40 on support surface 38, as shown in FIG. 7. The operator then rotates the pipe and as explained above, the angled cutting platform 30 serves to provide a feeding effect, thereby driving the pipe into the blade 68, resulting in the removal of uniform thickness of material from the outer circumference of the pipe. FIG. 8 is a simplified view of the arrangement showing the engagement of the blade with the pipe and the subsequent removal of material. Upon completion, the device is loosened, with the resultant shaved pipe being removed and readied for subsequent installation.

To shave a central portion of pipe, the pipe shaving device is sufficiently opened so as to allow entry of the pipe through opening 92 (see FIG. 4). The pipe shaving device is then subsequently tightened, and rotated about the pipe. As explained above, the angled cutting platform 30 provides a forward feeding effect, driving the pipe through the device. Once sufficient material has been removed from the outer circumference of the pipe, the device is loosened and removed from the pipe.

While the above discussion has generally made reference to rotation of a pipe relative to the pipe shaving device, it can be appreciated that the pipe shaving device is also suited for rotation about a pipe. This makes the device particularly useful with pipes that are part of an existing installation, pipes that are very long and not easily manipulated or sections of pipe that are held in a vice. The pipe shaving device is a manual tool that is generally suitable for use by one operator and the choice of rotating the pipe, or the tool, would be governed by the operator in view of the specific application being addressed.

The pipe shaving device provides a number of advantages compared to prior art technologies. The device is clearly suited for use on both end sections of pipe, as well as central regions. As explained above, the device can be opened, that is the two frame members can be spread apart sufficiently to allow the device to be dropped onto an existing section of pipe, without having to deal with a complicated articulated framework that is prone to misalignment. Further, the device is adjustable to accommodate a variety of pipe diameters. As explained above, the device is provided with a cutting platform that is angled relative to the longitudinal axis of the pipe, providing a self-feeding effect, ensuring even and consistent shavings of uniform thickness.

It can also be appreciated that the pipe shaving device is a robust tool that is well suited for use in the field. The adjustment of the tool can be readily handled by operators wearing gloves, thus being suited for use in adverse conditions. In fact, when dealing with pipes that are generally fixed in place (i.e. either held in a vice or those already part of an installation) the tool can be easily tightened and operated using one hand.

Although preferred embodiments of the present invention have been described, those of skill in the art will appreciate that variations and modifications may be made without departing from the spirit and scope thereof as defined by the appended claims.

The invention claimed is:

1. A device for removing a uniform layer of material from the outer circumference of a pipe, the device comprising:
   a first frame member providing at least two support surfaces for said pipe;
   a second frame member slidable on at least one slide mounted on said first frame member so as to allow said second frame member to linearly displace relative to said first frame member from a first open position, to a second engaged position, said second frame member providing at least one additional support surface adapted to cooperate with said at least two support surfaces of said first frame member, so as to allow said device to engage and support a pipe;
   a cutting platform mounted on said second frame member, said cutting platform providing a cutting blade for removing a uniform thickness of material from the outer diameter of said pipe when said pipe and said device are rotated relative to one another;
   an actuator for moving said second frame member relative to said first frame member along said at least one slider, wherein said actuator comprises a lock, and further wherein said actuator is a threaded shaft, rotatably attached at a first end to said first frame member, and adapted to threadably engage along its length said second frame member, so as to move said second frame member relative to said first frame member upon rotation of the threaded shaft;
   wherein said lock is rotatably and threadably mounted on said threaded shaft.

2. A device for removing a uniform layer of material from the outer circumference of a pipe, the device comprising:
   a first frame member providing at least two support surfaces for said pipe;
   a second frame member slidable relative to said first frame member so as to allow said device to engage and support a pipe;

a cutting platform mounted on said second frame member, said cutting platform being positioned to impart a feeding effect so as to direct a pipe through the device when said pipe and said device are rotated relative to one another, said cutting platform having a cutting blade for removing a uniform thickness of material from the outer diameter of said pipe;

an actuator for moving said second frame member relative to said first frame member, wherein said actuator is a threaded shaft, rotatably attached at a first end to said first frame member, and adapted to threadably engage along its length said second frame member, so as to move said second frame member relative to said first frame member upon rotation of the threaded shaft, wherein said actuator comprises a lock;

wherein said lock is rotatably and threadably mounted on said threaded shaft.

3. A device for removing a uniform layer of material from the outer circumference of a pipe, the device comprising:

a first frame member providing at least two support surfaces for said pipe;

a second frame member slidable relative to said first frame member so as to allow said device to engage and support a pipe;

a cutting platform mounted on said second frame member, said cutting platform being fixedly rositioned to impart a feeding effect so as to direct a pipe through the device when said pipe and said device are rotated relative to one another, said cutting platform having a cutting blade for removing a uniform thickness of material during the feeding in a spiral fashion from the outer diameter of said pipe;

wherein said cutting platform is outwardly angled relative to the longitudinal axis of a pipe contained therein.

4. The device of claim 3, wherein said outward angle is from about 2° to about 10°.

5. A device for removing a uniform layer of material from the outer circumference of a pipe, the device comprising:

a first frame member providing at least two support surfaces for said pipe;

a second frame member slidable relative to said first frame member so as to allow said device to engage and support a pipe;

a cutting platform mounted on said second frame member, said cutting platform being fixedly positioned to impart a feeding effect so as to direct a pipe through the device when said pipe and said device are rotated relative to one another, said cutting platform having a cutting blade for removing a uniform thickness of material during the feeding in a spiral fashion from the outer diameter of said pipe;

wherein said second frame member is slidable on at least one slider mounted on said first frame member so as to allow said second frame member to linearly displace relative to said first frame member from a first open position, to a second engaged position, said second frame member providing at least one additional support surface adapted to cooperate with said at least two support surfaces of said first frame member, so as to allow said device to engage and support a pipe; and wherein a plurality of slides are provided for guiding said second frame member relative to said first frame member.

6. A device for removing a uniform layer of material from the outer circumference of a pipe, the device comprising:

a first frame member providing at least two support surfaces for said pipe;

a second frame member slidable relative to said first frame member so as to allow said device to engage and support a pipe;

a cutting platform mounted on said second frame member, said cutting platform being fixedly positioned to impart a feeding effect so as to direct a pipe through the device when said pipe and said device are rotated relative to one another, said cutting platform having a cutting blade for removing a uniform thickness of material during the feeding in a spiral fashion from the outer diameter of said pipe;

wherein said cutting platform is biased radially inward towards a pipe contained therein.

* * * * *